United States Patent
Bares et al.

(10) Patent No.: US 8,667,283 B2
(45) Date of Patent: Mar. 4, 2014

(54) SOFT MESSAGE SIGNING

(75) Inventors: William Henry Bares, San Jose, CA (US); Srinivas Devadas, Lexington, MA (US); Vivek Khandelwal, Santa Clara, CA (US); Zdenek Paral, San Jose, CA (US); Richard Sowell, San Jose, CA (US); Tonghang Zhou, Sunnyvale, CA (US)

(73) Assignee: Verayo, Inc., San Jose, CA (US)

( * ) Notice: Subject to any disclaimer, the term of this patent is extended or adjusted under 35 U.S.C. 154(b) by 235 days.

(21) Appl. No.: 13/103,451

(22) Filed: May 9, 2011

(65) Prior Publication Data

US 2012/0290845 A1 Nov. 15, 2012

(51) Int. Cl.
*H04L 29/06* (2006.01)
(52) U.S. Cl.
USPC .............................. 713/170; 713/194; 726/26

(58) Field of Classification Search
USPC .................................................. 713/170, 194
See application file for complete search history.

(56) References Cited

U.S. PATENT DOCUMENTS

| | | | | |
|---|---|---|---|---|
| 7,783,889 B2* | 8/2010 | Srinivasan | | 713/179 |
| 2004/0193888 A1* | 9/2004 | Wiseman et al. | | 713/176 |
| 2006/0120345 A1* | 6/2006 | Sung et al. | | 370/351 |
| 2010/0070771 A1* | 3/2010 | Chen et al. | | 713/176 |
| 2010/0293384 A1* | 11/2010 | Potkonjak | | 713/176 |
| 2011/0055649 A1 | 3/2011 | Koushanfar et al. | | |

* cited by examiner

*Primary Examiner* — Yogesh Paliwal
(74) *Attorney, Agent, or Firm* — Occhiuti & Rohlicek LLP

(57) ABSTRACT

A message is signed using a PUF without having to exactly regenerate a cryptographic key. Another party that shares information about the PUF is able to verify the signature to a high degree of accuracy (i.e., high probability of rejection of a forged signature and a low probably of false rejection of a true signature). In some examples, the information shared by a recipient of a message signature includes a parametric model of operational characteristics of the PUF used to form the signature.

13 Claims, 4 Drawing Sheets

SOFT MESSAGE SIGNING

BACKGROUND

Conventional message signatures can be used for the purpose of demonstrating the authenticity of a digital transmission (e.g., a message or a document). For example, a digital signature that is determined to be valid gives a recipient of a message with that signature reason to believe that the message was created by a known sender, and was not altered during the course of the message transmission. Such signatures are commonly used to facilitate secure financial transactions, data transmissions, and in other cases where the integrity of a transmission is critical. Furthermore, message signatures can be used for non-repudiation purposes (i.e., the sender of a message cannot reasonably claim that they did not send a message that includes their signature).

Some digital message signing approaches employ cryptographic techniques (e.g., asymmetric cryptographic algorithms). For example, a conventional public key encryption scheme can be used to sign messages. For example, a party holding a public key can determine if a message was signed using the corresponding private key. In other examples, two parties may share a secret key, and each party who knows the key can verify that the signature was made by another party that knows the key.

One approach to generation for cryptographic keys makes use of fabrication variations between silicon devices, which provide a way of regenerating a device-specific key without requiring its storage. For example, physical uncloneable function (PUF) circuits have been used, typically in conjunction with error correction techniques to deal with intra-device variation, to regenerate keys that can be used for signing a message. In this way, a recipient can determine that a message was sent by particular hardware device.

In some applications, the security of knowing that a message as signed by a known device (e.g., a transmission endpoint) is important, but does not warrant existing techniques that use PUF-based generation of cryptographic keys. For example, in high speed of in low power devices, such prior techniques key generation techniques may have limitations.

SUMMARY

In one aspect, in general, a message is signed using a PUF without having to exactly regenerate a cryptographic key. Another party that shares information about the PUF is able to verify the signature to a high degree of accuracy (i.e., high probability of rejection of a forged signature and a low probably of false rejection of a true signature). In some examples, the information shared by a recipient of a message signature includes a parametric model of operational characteristics of the PUF used to form the signature.

In another aspect, in general, a method for verification of a message includes accepting a message and an associated message signature from a sender. Data representing characteristics of a signing circuit associated with an identity of the sender are accessed (e.g., from a database, in an encrypted or certified form from the sender, etc.). At least part of the signing circuit is emulated using the data representing the characteristics of the signing circuit to generate an emulated signature from the accepted message. The message is verified by comparing the accepted message signature and the emulated message signature.

In another aspect, in general, messages are exchanged between two endpoints, one with a hardware PUF and one with an emulated PUF. The latter is trusted with access to secret characteristics of the PUF. The information exchanged between the two endpoints is signed by the PUF response at one endpoint, and can be reliably verified as authentic by the opposite endpoint.

In an aspect, in general, a method for verification of a message includes accepting a message and an associated message signature from a sender, accessing data representing characteristics of a signing circuit associated with an identity of the sender, emulating at least part of the signing circuit using the data representing the characteristics of the signing circuit to generate an emulated signature from the accepted message, and verifying the message including comparing the accepted message signature and the emulated message signature.

Aspects may include one or more of the following features.

Verifying the message may include determining if a number of elements of the received signature matching corresponding elements of the emulated signature exceed a threshold. The method may further include determining the data representing the characteristics of the signing circuit, and storing said data in association with the identity of the sender. Emulating at least part of the signing circuit may include predicting a response of a physical unclonable function (PUF) circuit to a challenge. The PUF circuit may include a delay-based PUF circuit, and the data representing the characteristics of the signing circuit may include delay values associated with elements of the PUF circuit.

In another aspect, in general, a system for signed message transmission includes a first endpoint and a second endpoint. The first endpoint includes an input for accepting a message, an output for providing the message to a second endpoint, an output for providing a first signature to the second endpoint, a challenge generation module configured to generate a challenge based on the message, and a first signature generation module configured to accept the challenge and generate the first signature. The second endpoint includes an input for accepting the message, an input for accepting the first signature, the challenge generation module configured to generate the challenge based on the message, a second signature generation module configured to accept the challenge and generate a second signature, and a comparison module configured to compare the first signature and the second signature and generate an authentication result. One of the first endpoint and the second endpoint includes physical unclonable function (PUF) circuitry, and the other of the first endpoint and the second endpoint includes a model of the physical unclonable function (PUF) circuitry that is sufficient to predict an output of the physical unclonable function (PUF) circuitry to a plurality of challenges.

Aspects may include one or more of the following features.

The second endpoint may include a random number generation module configured to generate a single use random number that is transmitted to the first endpoint. The challenge generation module may be further configured to generate the challenge based on the single use random number. The first endpoint may be configured to transmit an identifier to the second endpoint and the second endpoint may be configured to select a signature module characteristic from a database of signature module characteristics and to configure the second signature module using the signature module characteristic selected from the database. The challenge generation module may include a hash function.

The comparison module may include calculating a Hamming distance between the first signature and the second signature. Generating an authentication result may include applying a threshold to the Hamming distance between the first signature and the second signature. The challenge generation module may be further configured to generate the challenge based on a direction of transmission.

Other features and advantages of the invention are apparent from the following description, and from the claims.

DESCRIPTION

Figure 1:
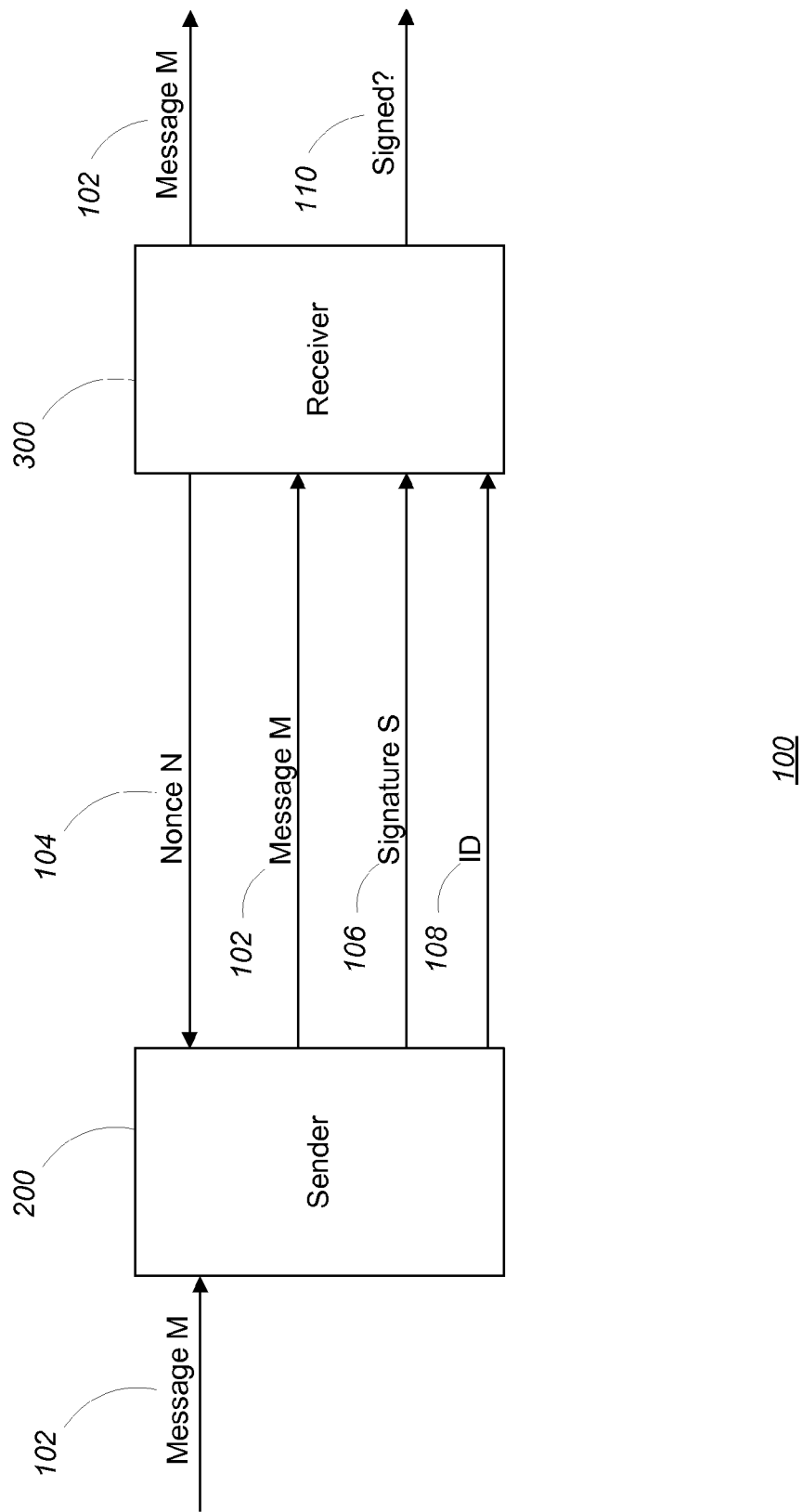
FIG. 1 is a block diagram overview of message passing between a sender and a receiver.

This following description relates to soft message signing and in particular, soft message signing using physical unclonable functions (PUFs). A variety of forms of PUFs can be used, for example, as described in U.S. Pat. No. 7,904,731, titled "Integrated Circuit That Uses a Dynamic Characteristic of the Circuit," or U.S. Pat. Pub. 2007/0250938, titled "Signal Generator Based Device Security," which are incorporated herein by reference.

Generally, a physical unclonable function (PUF) in an electronic circuit that provides a way to distinguish integrated circuits ("chips") from one another based, for instance, on fabrication variations that cause different chips fabricated according to a common design (i.e., a common mask) to have measurably different characteristics. The ability to distinguish one chip from another using a PUF is a potentially valuable way to authenticate integrated circuits. One or more approaches described below relate to particular PUF implementations suitable for use in signing of messages.

In the message transmission system described below, messages are signed by a first endpoint (e.g., a sender) and the signature of the message is authenticated at a second endpoint (e.g., a receiver). In some examples, a Physical Unclonable Function (PUF) is included in one of the endpoints and a model of the same PUF is included in the other endpoint.

In some examples, the procedure for signing a message before passing it from a sender to a receiver begins by passing a single use random number (i.e., a nonce) from the receiver to the sender. The sender uses the random number, the direction of transmission, and the message as inputs to a one-way function, yielding a PUF challenge. The PUF challenge is provided to a sender-side PUF where it is used to generate a sender-side signature for the message.

The message and the sender-side signature are transmitted to the receiver using, for example, a near field communication connection, radio frequency communications, or a telecommunications network. In some examples, an ID (e.g., a serial number) is also passed from the sender to the receiver. At the receiver, the nonce (i.e., the same nonce that was previously passed to the sender), the received message, and the direction of the message transfer are used as inputs to a one-way function that performs the same operation as the one-way function included in the sender, yielding a PUF challenge. The PUF challenge is provided to a receiver-side PUF where it is used to generate a receiver-side signature for the message. The receiver authenticates the message by comparing the receiver-side signature to the sender-side signature and determining whether the signatures are sufficiently similar. In some examples, the comparison of signatures includes calculating a Hamming distance between the two signatures and determining whether the Hamming distance is under a predetermined threshold. If the Hamming distance is under the threshold, the message is considered to be authentic.

Referring to FIG. 1, an exemplary scenario of message transmission between a sender endpoint 200 and a receiver endpoint 300 is configured to transmit and authenticate a signed message 102. Initially, the sender endpoint accepts as input the message, M 102 from an external entity (not shown) and a nonce, N 104 from the receiver endpoint 300. Using the message 102 and the nonce 104, the sender 200 generates a sender-side signature, S 106. The sender-side signature 106, message 102, and a sender ID 108 (i.e., a serial number) are transmitted to the receiver 300.

The receiver 300 accepts the message 102, sender-side signature 106, and ID 108 as input and generates an output 110 indicating whether or not the message 102 is authentic. The output 110 and the message 102 are presented to a downstream user or system (not shown).

In the context of this application, an endpoint is defined as either a sender of a message or a receiver of a message. The message communication system describe herein allows for exactly one hardware endpoint and an arbitrary number of emulation endpoints with one hardware/emulation endpoint pair used per message transfer.

In general, the main difference between a hardware endpoint and an emulation endpoint is that the PUF included in the hardware endpoint is a physical implementation of a PUF circuit whereas the PUF included in the emulated endpoint is a model of the PUF included in the hardware endpoint.

In the following description of an exemplary embodiment, the hardware endpoint is described in the context of being the sender and the emulation endpoint is described as being the receivers. It is noted that in some other examples, the sender PUF is emulated and the receiver PUF is implemented in hardware.

The sender, which is the single hardware endpoint in this example, accepts a message and a nonce as input and outputs the message, a sender-side signature, and a sender ID. As is further described below, the sender-side signature is generated by applying a one-way function to the message, nonce, and a direction transmission and using the result of the one-way function as a challenge to a hardware PUF which generates the sender-side signature.

Figure 2:
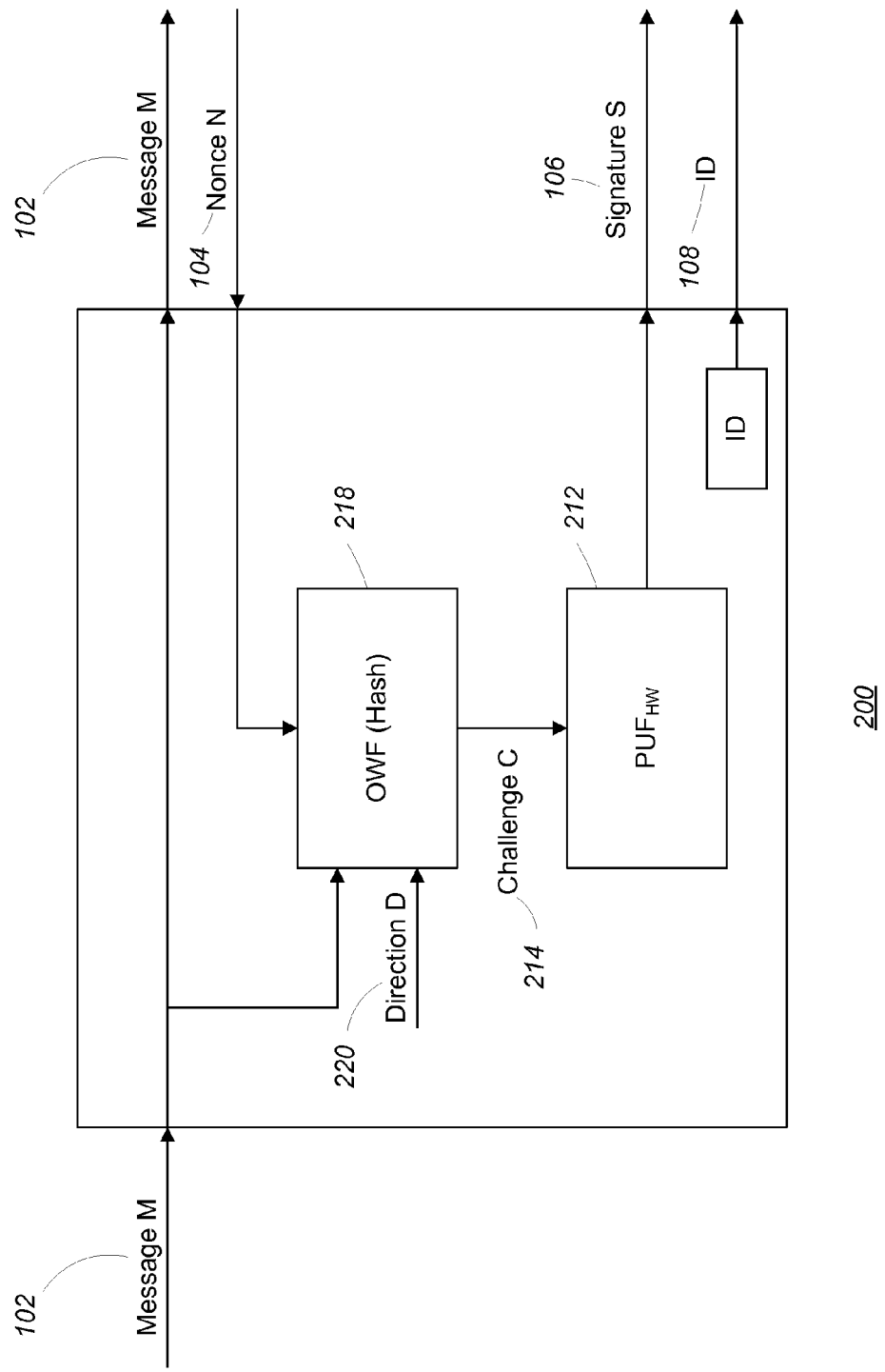
FIG. 2 is a block diagram of a sender.

Referring to FIG. 2, one example of a hardware endpoint 200 accepts a message, M 102 and a nonce, N 104 as input. The message 102 is the message that the sender intends to communicate to the receiver 300 and the nonce 104 is a single use unique number generated by the receiver 300 that ensures that the signatures 106 generated by the sender 200 do not repeat. The message 102 and the nonce 104 are provided to a deterministic one-way function 218 along with a direction of the transmission, D 220. The direction of the transmission 220 is used to thwart attacks whereby one software endpoint's response could be used to emulate an opposite operation at another software endpoint. Use of the direction of the transmission 220 ensures that the input to the one-way-function 218 is affected by the direction of the transmission 220 simultaneously in both endpoints.

In some examples, the one-way function 218 generates a challenge, C 214 by hashing a concatenated block consisting of the nonce N 104, message M 102, and the direction of the transmission D 220 as follows:

$$C = OWF(N\|M\|D)$$

The challenge 214 is provided to the challenge input of a hardware PUF (PUF$_{HW}$) 212. In some examples, PUF$_{HW}$ 212 is a delay-based PUF, for instance as described in U.S. Pat. No. 7,904,731, which is incorporated herein by reference.

This type of PUF uses a relative delay between two paths through circuit elements as the basis for determining bits of a device-specific quantity.

$PUF_{HW}$ 212 is configured to accept the challenge 214, and generate a sender-side signature, S, 106. The sender-side signature 106 is unique to the specific hardware instance of $PUF_{HW}$ 212 in the hardware endpoint 200 and can be defined as follows:

$$S = PUF_{HW}(C)$$

In some examples, the width (in bits) of the challenge 214 is determined by the design of $PUF_{HW}$ 212 and the width of the sender-side signature 106 is scalable as required by the application. In general, PUFs generate only one response bit per challenge word, thus signatures are formed as strings of response bits that are produced by presenting a deterministic challenge sequences seeded by the challenge value C 214 to the PUF.

The sender-side signature 106 and the message 102 are output to the receiver 300 along with a sender ID 108 which provides an identification of the hardware PUF 212 to the receiver 300.

The receiver, which is an emulation endpoint in this example, accepts the message, the signature, and the sender ID as input and outputs a nonce, the message, and an indication of the authenticity of the message. As is described further below, the authenticity of the message is determined by using the message, nonce, and a direction to create a challenge that is provided to a simulated version of the sender's PUF ($PUF_{Simulated}$). $PUF_{Simulated}$ generates a receiver-side signature that is compared to the sender-side signature received from the sender. If the two signatures match (within some tolerance), then the message is considered to be authentic.

Figure 3:
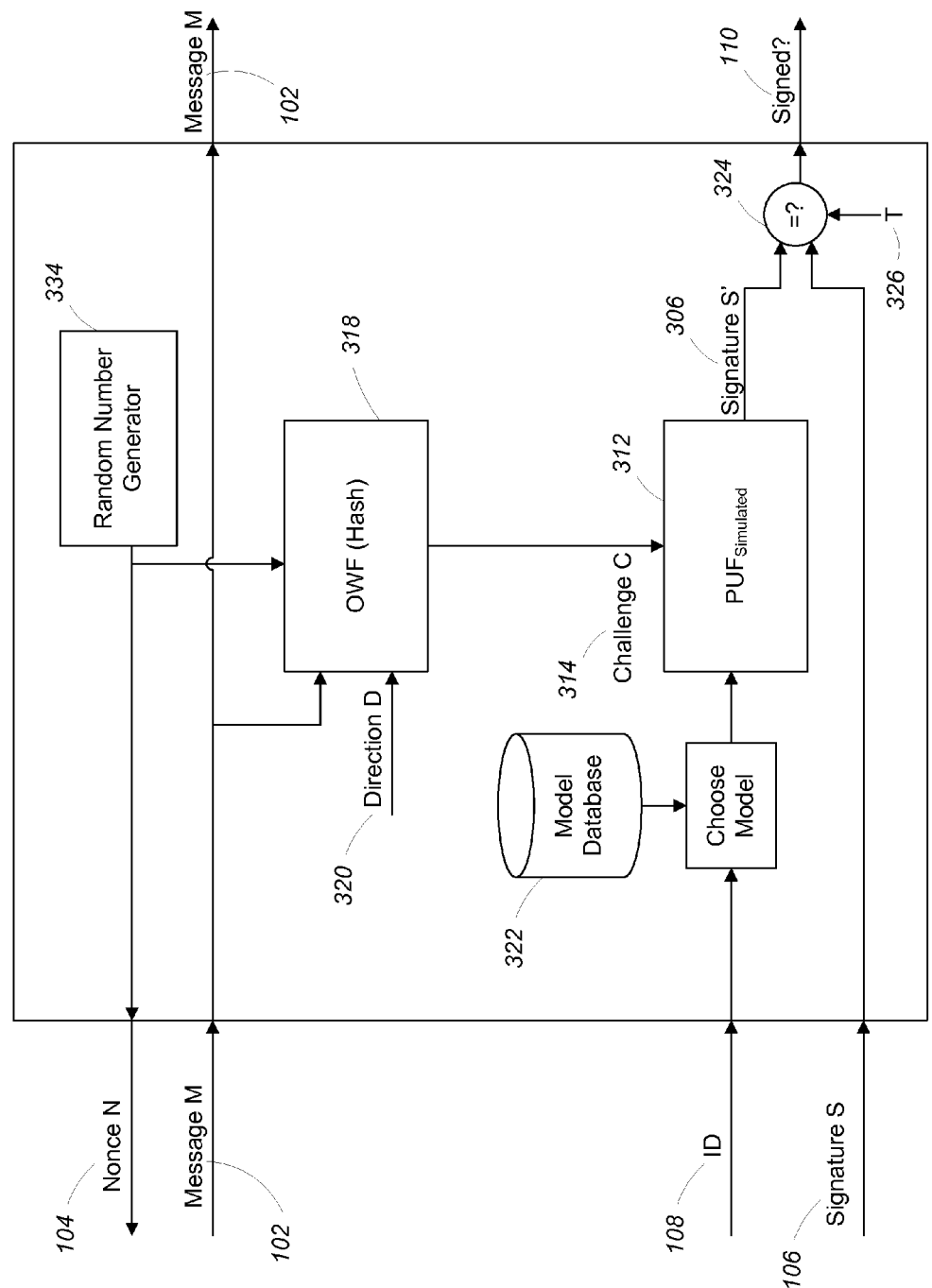
FIG. 3 is a block diagram of a receiver.

Referring to FIG. 3, one example of an emulated receiver 300 receives the message 102, sender-side signature 106, and sender ID 108 as input from the sender 200. The received message 102 and the nonce 104 (i.e., the same nonce that was sent to the sender 200, as described above) are provided to a deterministic one-way function 318 along with a direction of transmission of the message, D 320.

Generally, the emulation endpoint must feature the same one-way function 318 as the hardware endpoint. In some examples, the one-way function 318 generates a challenge, C 314 by hashing a concatenated block consisting of the nonce 104, message 102, and the direction of transmission 320 as follows:

$$C = OWF(N|M|D)$$

The challenge 314 is provided to the challenge input of a simulated PUF ($PUF_{Simulated}$) 312.

The receiver 300 has exclusive access to a database 322 of previously acquired secret PUF characteristics (i.e., a number of models of PUFs) which allow a close approximation of the hardware PUF's 212 functionality.

The model that defines $PUF_{Simulated}$ 312 is determined by using the ID input 108 to choose a model from the model database 322. For example, the ID can be a serial number and certain ranges of serial numbers can be associated with certain hardware PUFs. Thus the serial number can be used to identify an associated hardware PUF and then to choose the model of the identified PUF to use as $PUF_{Simulated}$ 312. With the exception of being emulated, all other functionality of this PUF is identical to the functionality of its hardware counterpart.

The challenge 314 provided to the $PUF_{Simulated}$ 312 is used to generate a receiver-side signature, S' 306 as follows:

$$S' = PUF_{Simulated}(C)$$

An authentication comparator 324 receives the sender-side signature 106 and the receiver-side signature 306 as input and determines whether or not the received message 102 is authentic. In some examples, the Hamming distance between the two signatures 106, 306 is calculated. If the Hamming distance between the two signatures 106, 306 does not exceed a preset threshold, T 326, the message is deemed authentic by the receiver. For example, if the signatures 106, 306 are each 64 bits wide and 8 bits differ between the two signatures, then the Hamming distance is 8. If the threshold 326 allows for any Hamming distances of less than 10 to be considered authentic, the message 102 would be considered to be authentic. The message 102 and the Boolean result 110 are presented to a user or downstream system (not shown) for further processing.

Figure 4:
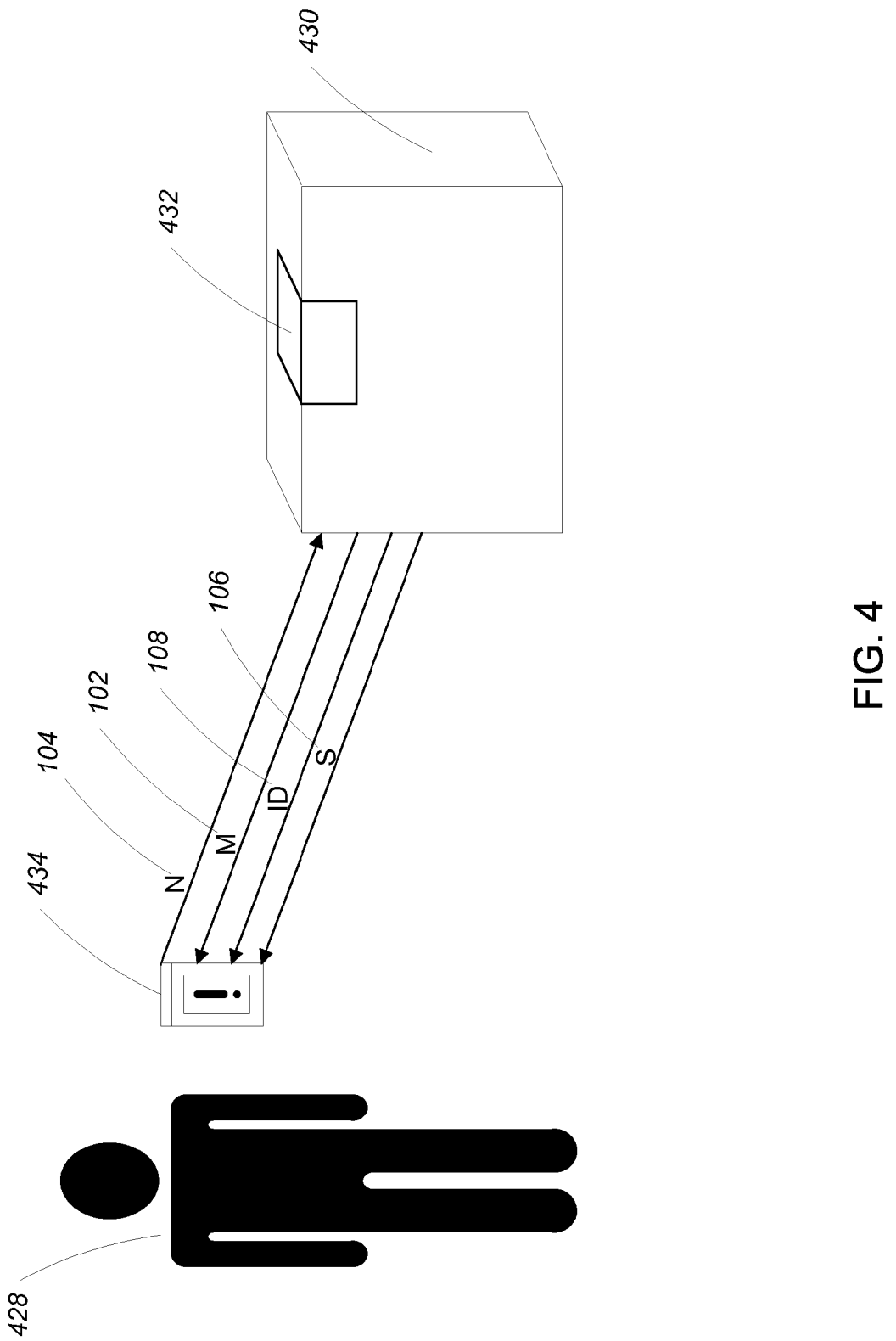
FIG. 4 is an example of use.

Referring to FIG. 4, an exemplary use of the previously described method for signing messages is illustrated using RFID technology.

In the example, a user 428 is performing an inventory of goods in, for example, a warehouse by scanning RFID tags 432 that are used to seal boxes of goods 430 using an RFID reader 434. The RFID reader 434 includes an emulated PUF as in the receiver endpoint described above. The RFID tag 432 includes a hardware PUF as in the sender endpoint described above.

When the user 428 scans the RFID tag 432, a radio frequency communication causes a nonce 104 to be transmitted from the RFID reader 434 to the RFID tag 432. The RFID tag 432 then uses the nonce 104, an inventory message 102, and a direction of transmission to generate a sender-side signature 106. The RFID tag 432 transmits the inventory message 102, a serial number 108 of the box 430, and the sender-side signature 106 to the RFID reader 434.

The serial number of the box 430 is used by the RFID reader 434 to determine which PUF model in its database of PUF models corresponds to the hardware PUF in the RFID tag 432. The determined PUF model is then used to generate a receiver-side signature based on the nonce 104, the direction of transmission, and the inventory message 102 received from the RFID tag 432.

The sender-side signature 106 is then compared to the receiver-side signature in the same manner as described above to determine if the inventory message 102 is authentic. If the inventory message 102 is deemed authentic, the user 428 moves on to the next box 430. If the inventory message 102 is deemed non-authentic, the RFID reader 434 may present an indication of message non-authenticity to the user 428. The user 428 may then proceed in determining if the box 430 has been tampered with.

In general, no secret information is passed during the communication of the nonce 104, message 102, and signature 106. The emulation endpoint 300, however, has to be trusted to have access to secret PUF characteristics which are sufficient to emulate the hardware PUF 212. Since it operates on this secret, in some examples, the emulation endpoint 300 should execute in a trusted element, such as a secure processor, secure server, or a closed hardware circuit.

The reliability of the authentication decision depends on the signature width, PUF entropy (e.g. number of individual delay elements), and a proper choice of Hamming distance threshold T.

The resistance of the authentication decision to attacks is based on the strength of the one-way function (OWF, hash), and also on the strength of the PUF (i.e. the adversary's difficulty to establish a model of the PUF from the challenge/response data obtained by monitoring genuine endpoint communications).

In general, the emulation endpoints are responsible for maintaining the PUF characteristics secret.

Collision probability (choice of width of nonce N) and overall quality of the random number generators affect the chances of a successful replay attack.

Either of the endpoints can be a receiver, as long as it has a random number generator for the nonces N and an authentication comparator to verify the message signature S with its local version L.

In some examples, the model of the PUF may include a set of estimated delay parameters, or a set of oscillation frequencies of the physical PUF.

In some examples, an endpoint with a physical PUF may have data representing a model of its PUF in encrypted form, and may provide that encrypted model to the other endpoint. For example, such an approach is described in U.S. Pat. Pub. 2010/0127822, titled "Non-Networked RFID-PUF Authentication," which is incorporated herein by reference. In some examples, this encryption may also be cryptographically signed by another party so that the recipient can trust the association of the model with the endpoint. Therefore, the soft signature may form part of a chain of trust.

In some examples, the endpoints are nodes in a communication network, for example, in a wired or wireless local area network, a wide area data network, or a telecommunication network.

It is to be understood that the foregoing description is intended to illustrate and not to limit the scope of the invention, which is defined by the scope of the appended claims. Other embodiments are within the scope of the following claims.

What is claimed is:

1. A method for verification of a message comprising:
    transmitting a value to a sender;
    accepting a message and an associated message signature from the sender;
    accessing data representing characteristics of a signing circuit associated with an identity of the sender;
    generating a challenge based on the accepted message and the same value transmitted to the sender, wherein generating the challenge includes applying a deterministic one-way function to inputs that include the message, the value, and a direction of transmission of the message;
    emulating, using emulation circuitry, at least part of the signing circuit using the data representing the characteristics of the signing circuit to generate an emulated signature from the generated challenge; and
    verifying the message including comparing the accepted message signature and the emulated message signature.

2. The method of claim 1 wherein verifying the message includes determining if a number of elements of the received signature matching corresponding elements of the emulated signature exceed a threshold.

3. The method of claim 1 further comprising:
    determining the data representing the characteristics of the signing circuit, and storing said data in association with the identity of the sender.

4. The method of claim 3 wherein emulating at least part of the signing circuit includes predicting a response of a physical unclonable function (PUF) circuit to the generated challenge.

5. The method of claim 4 wherein the PUF circuit comprises a delay-based PUF circuit, and wherein the data representing the characteristics of the signing circuit includes delay values associated with elements of the PUF circuit.

6. A system for signed message transmission comprising:
    a first endpoint including
        an input for accepting a value;
        an output for providing a message and a first signature to a second endpoint;
        a first challenge generation module including circuitry configured to generate a challenge based on the message and the value using an operation;
        a first signature generation module including circuitry configured to accept the challenge and generate the first signature from the challenge;
    a second endpoint including
        an output for providing the value;
        an input for accepting the message and the first signature;
        a second challenge generation module including circuitry configured to generate the challenge based on the message and the value using the same operation that was used by the first challenge generation module;
        a second signature generation module including circuitry configured to accept the challenge and generate a second signature from the challenge;
        a comparison module including circuitry configured to compare the first signature and the second signature and generate an authentication result;
    wherein the first signature generation module includes physical unclonable function (PUF) circuitry, and the second signature generation module includes emulation circuitry configured to emulate the physical unclonable function (PUF) circuitry using a model of the physical unclonable function (PUF) circuitry that is sufficient to predict an output of the physical unclonable function (PUF) circuitry to a plurality of challenges, and
    wherein the first challenge generation module and the second challenge generation module are each configured to generate the challenge based on the message, the value, and a direction of transmission of the message.

7. The system of claim 6 wherein the second endpoint further includes a random number generation module including circuitry configured to generate the value as a single use random number that is transmitted to the first endpoint.

8. The system of claim 7 wherein the first challenge generation module and the second challenge generation module are each configured to generate the challenge based on the message and the single use random number using the operation, wherein the operation includes a deterministic one-way function.

9. The system of claim 6 wherein the first endpoint is configured to transmit an identifier to the second endpoint and the second endpoint is configured to select a signature module characteristic from a database of signature module characteristics and to configure the second signature module using the signature module characteristic selected from the database.

10. The system of claim 6 wherein the first challenge generation module and the second challenge generation module are each configured to use a hash function in the operation used to generate the challenge.

11. The system of claim 6 wherein the comparison module includes calculating a Hamming distance between the first signature and the second signature.

12. The system of claim 11 wherein generating an authentication result includes applying a threshold to the Hamming distance between the first signature and the second signature.

13. The system of claim 6 wherein the first challenge generation module and the second challenge generation module are each configured to generate the challenge by applying a deterministic one-way function to inputs that include the message, the value, and the direction of transmission of the message.

* * * * *